United States Patent [19]

Diamantoglou et al.

[11] Patent Number: 5,360,636
[45] Date of Patent: Nov. 1, 1994

[54] METHOD FOR COATING CELLULOSIC MEMBRANES

[75] Inventors: Michael Diamantoglou, Erlenbach/Main; Edmund Richter, Wuppertal; Thomas Rintelen, Schwelm; Gustav Düweg, Wuppertal; Angelika Reiche, Cologne; Ralf Tatas, Wuppertal, all of Germany

[73] Assignee: Akzo NV, Arnhem, Netherlands

[21] Appl. No.: 689

[22] Filed: Jan. 5, 1993

[30] Foreign Application Priority Data

Jan. 7, 1992 [DE] Germany .............................. 4200162

[51] Int. Cl.$^5$ ................................................ B05D 5/00
[52] U.S. Cl. ................................... 427/244; 427/246; 427/339
[58] Field of Search ..................... 427/2, 339, 244, 246

[56] References Cited

U.S. PATENT DOCUMENTS

| | | | |
|---|---|---|---|
| 2,241,384 | 5/1941 | Bateman et al. | 427/2 |
| 3,018,192 | 1/1962 | Hennemann et al. | 427/339 |
| 3,303,051 | 2/1967 | Paul | 427/339 |

(List continued on next page.)

OTHER PUBLICATIONS

Chenoweth, D. et al., "Anaphylatoxin formation during hemodialysis: Effects of different dialyzer membranes," *Kidney International*, vol. 24 (1983), pp. 764–769 (no month available).

Chenoweth, "Biocompatibility of Hemodialysis Membranes, Evaluation with C3a Anaphylatoxin Radioimmunoassays," *Asaio Journal*, Apr./Jun. 1984, vol. 7, pp. 44–49.

Primary Examiner—Shrive Beck
Assistant Examiner—Diana L. Dudash
Attorney, Agent, or Firm—Oliff & Berridge

[57] ABSTRACT

A process for improving the biocompatibility of cellulosic film membranes is characterized by the fact that the film membranes are coated during or after their preparation with cellulose ethers and/or cellulose esters and/or cellulose carbamates whose structures conform to the formulas

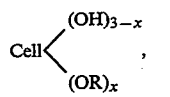 a.

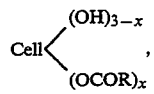

b.

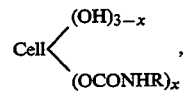

c.

wherein Cell is the skeleton of the unmodified cellulose molecule without hydroxyl groups; x conforms to the degree of modification, which is in the range of 0.002 to 3; R is an (optionally substituted) alkyl and/or alkenyl and/or aryl and/or arylalkyl group and the carbon chain of the group R contains 1 to 36 carbon atoms and may be interrupted by hetero atoms such as O, S, N, and contains basic and/or acidic groups such as 13 NR'$_2$, —COOR', and/or —SO$_3$R' or their salts, wherein R'=H or R.

18 Claims, No Drawings

U.S. PATENT DOCUMENTS

| | | | |
|---|---|---|---|
| 4,194,024 | 3/1980 | Holst et al. | 427/324 |
| 4,276,172 | 6/1981 | Henne et al. | 210/490 |
| 4,278,790 | 7/1981 | McCormick | 536/84 |
| 4,444,663 | 4/1984 | Aoyagi et al. | |
| 4,468,428 | 8/1984 | Early | 427/430.1 |
| 4,668,396 | 5/1987 | Baurmeister et al. | |
| 4,741,927 | 5/1988 | Pelger et al. | 427/245 |
| 4,772,393 | 9/1988 | Pelger et al. | 210/500.29 |
| 4,772,399 | 9/1988 | Stuart et al. | 210/769 |
| 4,981,959 | 1/1991 | Diamantoglou | 536/56 |
| 5,026,834 | 6/1991 | Diamantoglou et al. | 536/20 |
| 5,068,269 | 11/1991 | Diamantoglou | 524/35 |
| 5,087,366 | 2/1992 | Diamantoglou et al. | 210/500.23 |
| 5,093,486 | 3/1992 | Diamantoglou | 536/20 |
| 5,171,444 | 12/1992 | Diamantoglou et al. | 210/500.23 |

FOREIGN PATENT DOCUMENTS

| | | |
|---|---|---|
| 1222107 | 5/1987 | Canada . |
| 330106 | 8/1989 | European Pat. Off. . |
| 376069 | 10/1990 | European Pat. Off. . |
| 459293 | 12/1991 | European Pat. Off. . |
| 2089396 | 1/1972 | France . |
| 2380052 | 9/1978 | France . |
| 2705735 | 8/1978 | Germany . |
| 3136573 | 6/1982 | Germany . |
| 3317037 | 11/1984 | Germany . |
| 3410133 | 10/1985 | Germany . |
| 3430503 | 2/1986 | Germany . |
| 3438531 | 4/1986 | Germany . |
| 3524596 | 1/1987 | Germany . |
| 3723897 | 1/1989 | Germany . |
| 3840175 | 6/1989 | Germany . |
| 290659 | 6/1991 | Germany . |
| 2022117 | 12/1979 | United Kingdom . |
| 1085994 | 4/1984 | U.S.S.R. . |

METHOD FOR COATING CELLULOSIC MEMBRANES

FIELD OF THE INVENTION

This invention relates to a method for improving the biocompatibility of cellulosic film membranes.

BACKGROUND OF THE INVENTION

In hemodialysis by means of membranes made of regenerated cellulose, besides other phenomena, clear complement activation has also been found. The complement system in blood serum is a complex plasma enzyme system consisting of many components that serves in various ways as a defense against damage from invading foreign cells (bacteria, etc.). If antibodies against the invading organism are present, complement-specific activation can occur from the complex of antibodies with antigenic structures of the foreign cells; otherwise, complement activation occurs by an alternative path through special surface features of the foreign cells. The complement system is based on a number of plasma proteins. After activation, these proteins react specifically with one another in a definite order, and at the end a cell-damaging complex is formed that destroys the foreign cells.

Peptides are liberated from individual components, which initiate inflammatory processes and sometimes also have adverse pathological consequences for the organism. It is assumed that activation in the case of hemodialysis membranes made of regenerated cellulose occurs via the alternative path. This complement activation is determined objectively by determination of the presence of complement fragments $C_{3a}$ and $C_{5a}$.

Reference is made in this regard to the following papers: D. E. Chenoweth et al., *Kidney International*, Vol. 24, Pages 764 ff, 1983, and D. E. Chenoweth, *Asaio-Journal*, Vol. 7, Pages 44 ff, 1984.

Although the clinical significance of complement activation has not yet been clarified, it is attempted to prevent it as much as possible during hemodialysis.

Cellulosic membranes have long been used for dialysis and ultrafiltration, and there is a desire to have available cellulosic membranes that show as little complement activation as possible. This applies particularly to cellulosic film membranes.

German Patent Application DE-OS 27 05 735 discloses a dialysis membrane and a method for making this cellulosic dialysis membrane in which one or more cuprammonium cellulose solutions and at least one cuprammonium cellulose solution containing modified cellulose are fed through a spinneret with at least two separately supplied slits. In this process, a solution containing dialkylaminoalkylcellulose is applied to the cellulosic substrate directly during a direct spinning process. The cellulose layer located on the blood side is a completely or partially modified cellulose that contains chemically bonded antithrombogenic substances.

According to German Patent DE-PS 35 24 596, dialysis membranes for hemodialysis are obtained in the form of thin films, tube films, or hollow fibers, with an average degree of substitution of the modified cellulose being in the range of 0.02 to 0.07. The average degree of modification of cellulose modified by substitution means the average number of substituents per glucose anhydride unit of the cellulose constituting the membrane. The desired average degree of substitution is obtained by blending substituted cellulose with non-substituted cellulose, whereupon this blend is then spun in the usual way.

German Patent DE-PS 34 38 531 likewise describes modified cellulosic membranes obtained from mixtures of unmodified cellulose with modified cellulose. The cellulosic membrane can be made by the usual methods described in the literature.

A dialysis membrane with improved biocompatibility is already known from German Patent Application DE-OS 35 24 596, which is distinguished by the fact that the average degree of substitution of a modified cellulose is 0.02 to 0.07. This dialysis membrane consists of modified cellulose and preferably contains modified cellulose that has a structure characterized by the formula Cellulose—R'—X—Y wherein
X is —

and/or —S— and/or —SO— and/or —SO$_2$— and/or

and/or —CO—O— and/or —O—;
Y is —R and/or —NR$_2$ and/or —Si(OR")$_3$ and/or —SO$_3$H and/or —COOH and/or

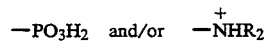

or their salts;

R' is an alkylene group and/or cycloalkylene group and/or arylene group with a total of 1 to 25 carbon atoms;

R" is a hydrogen atom or R; and

R is an alkyl group with 1 to 5 carbon atoms and/or a cycloalkyl group and/or aryl group.

This known dialysis membrane is able to reduce blood coagulation, leukopenia, and complement activation to a substantial extent.

German Patent Application P 37 23 897.3 describes cellulose derivatives with the general formula:

$$\text{Cellulose} \begin{cases} (OZX)_m \\ (O-CO-Y)_n \end{cases}$$

wherein
—Z— is an optionally substituted alkylene, alkenylene, alkynylene, cycloalkylene, or benzylene or xylylene group; and
X is

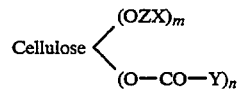

wherein
R is a hydrogen atom or an alkyl or alkenyl group with 1 to 25 carbon atoms, or a cycloalkyl, tolyl, or phenyl group,
and Y is an optionally substituted alkyl, alkenyl, or alkynyl group with 1 to 36 carbon atoms, a cycloalkyl group, or a phenyl, tolyl, or benzyl group, or

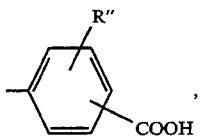

or —(CH$_2$)$_r$—COOH,

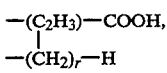

or a (—CH=CH—COOH) group or an NH-R group, and R has the same meaning as above, and r=1-20
m=0-2.5
n=0.2 to 2.95
provided that when m=0, n≧1.55, when Y is an alkyl group with 1–5 carbon atoms, a —(CH$_2$)$_r$—COOH group with r=0, 1, or 2, or a phthalic acid group;

and the degree of polymerization is more than 400, and which can be made by homogeneous reaction in a mixture of dimethylacetamide and/or N-methylpyrrolidone with LiCl after activation of the cellulose starting material without the presence of LiCl; its production and its use for membranes and fibers.

Up to now, however, it has been impossible, or possible only with great effort, to treat a cellulosic film membrane so as to obtain not only a properly functioning cellulosic membrane but one with only minimal complement activation.

SUMMARY OF THE INVENTION

Therefore, it is an object of this invention to make available a method by which a cellulosic film membrane can be coated and in which biocompatibility, in particular minimization of complement activation, is increased by the coating.

DESCRIPTION OF THE PREFERRED EMBODIMENTS

This object is met pursuant to the present invention by coating film membranes during or after their preparation with (a) cellulose ethers and/or (b) cellulose esters and/or (c) cellulose carbamates whose structures conform to the formulas:

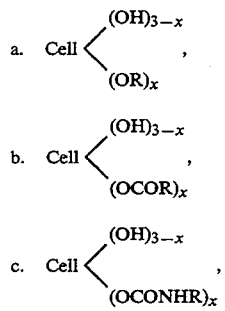

wherein Cell is the skeleton of an unmodified cellulose molecule without hydroxyl groups; x conforms to the degree of modification, which lies in the range of 0.002 to 3; R is selected from the group consisting of an (optionally substituted) alkyl, alkenyl, aryl, arylalkyl group and combinations thereof; and the carbon chain of the group R contains from 1 to 36 carbon atoms and may be interrupted by hetero atoms such as O, S, N, and contains basic and/or acidic groups such as —NR'$_2$, —COOR', and/or —SO$_3$R' or their salts, wherein R'=H or R.

Properties of the membrane material can be controlled by substitution in the group. Thus, the basic cellulose ether is preferably dimethylaminoethyl-, diethylaminoethyl-, dipropylaminoethyl-, diisopropylaminoethyl-, dibutylaminoethyl and/or diisobutylaminoethylcellulose, and the degree of modification is x=0.01 to 0.5.

According to another preferred embodiment, the cellulose ether is benzyl- and/or methylbenzylcellulose and the degree of modification is x=0.005 to 0.2.

The cellulose ester is preferably cellulose dodecenylsuccinate and/or cellulose hexadecenylsuccinate, and the degree of modification is x=0.005 to 0.5.

Preferred cellulose carbamates are cellulose butyl-, cellulose octadecyl-, cellulose hexyl-, cellulose cyclohexyl-, cellulose phenyl-, and/or cellulose tolylcarbamate with a degree of modification x=0.01 to 0.9.

The invention is implemented by coating the cellulosic film membrane with a cuprammonium solution of the cellulose derivative, and coagulating, washing, and drying it.

However, it is also possible to coat the cellulosic film membrane with a solution of the cellulose derivative in dimethylacetamide/lithium chloride or N-methylpyrrolidone/lithium chloride, whereupon it is then coagulated, washed, and dried.

According to another embodiment of the method pursuant to the invention, however, a cellulose ether, ester, or carbamate can also be used that has a degree of modification above 1.2 and is soluble in an organic solvent such as ketones, ethers, esters, alcohols, glycols, nitriles, amides, sulfoxides, or in a mixture thereof.

The cellulosic film membrane can be coated with the cellulose derivative dissolved in organic solvents; the solvent is then removed appropriately by drying the treated membrane.

The invention is described with reference to the Examples below:

EXAMPLES

For the purposes of the following Examples, complement activation is evaluated with reference to the C$_{5a}$ fragments. To do this, 300 ml of heparinized blood plasma is recirculated in vitro through a dialyzer with an effective exchange area of 1 m$^2$ for a period of 4 hours with a plasma flow rate of 100 ml/min. The C$_{5a}$ fragments in the plasma are determined by the RIA method (Upjohn test). The relative complement activation at the particular time of measurement is calculated in percent from the ratio of concentration at the time of sampling and the initial value. The measured value after 4 hours of recirculation is used for rating. Thin membranes are incubated for 3 hours with heparinized blood and the C$_{5a}$ fragments are then determined.

EXAMPLE 1

A Cuprophan® film membrane (40×16 cm) is coated uniformly on both sides by rollers with a cuprammonium solution containing 5 wt. % benzylcellulose with a degree of modification of 0.10. The membrane is first treated with 1% aqueous sodium hydroxide solution, then washed with 1% aqueous sulfuric acid solution and completely deionized water, then treated with glycerin, stretched on a frame, and dried at 25° C. The $C_{5a}$ activation of the coated membrane is reduced by 92% compared to an uncoated membrane.

EXAMPLE 2

A Cuprophan® film membrane (40×16 cm) is coated and treated similarly to Example 1 with a cuprammonium solution containing 5 wt. % cellulose dodecenylsuccinate with a degree of modification of 0.10. The membrane shows $C_{5a}$ activation reduced by 95% compared to an uncoated membrane.

EXAMPLE 3

A Cuprophan® film membrane (40×16 cm) is coated uniformly on both sides by rollers with a solution consisting of 89 wt. % dimethylacetamide, 7 wt. % lithium chloride, and 4 wt. % cellulose butylcarbamate with a degree of modification of 0.60. The membrane is then placed in a water bath, washed for 1 hour, treated with glycerin, stretched on a frame, and dried at 25° C. The coated membrane shows 90% less $C_{5a}$ activation than the uncoated membrane.

EXAMPLE 4

A Cuprophan® film membrane (40×16 cm) is coated uniformly on both sides with a solution consisting of 94 wt. % dimethylacetamide and 6 wt. % cellulose 2,6-butyrate, stretched on a frame, and dried in a vacuum drying oven at 60° C. The $C_{5a}$ activation of the coated membrane is reduced by 80% compared to an uncoated membrane.

EXAMPLE 5

A cellulosic film membrane made from a cuprammonium solution with 9 wt. % cellulose in the solution (Cuprophan®; Akzo) is suspended on a rotating mechanism and drawn at a speed of 15 m/min through a coating bath containing a cuprammonium solution with 10 wt. % diethylaminoethylcellulose diluted to 0.2 wt. % with 11% alkaline ammonia solution, and is introduced at the same speed into a bath with wash acid (dilute sulfuric acid). The coated membrane is then washed with water in the usual way, then treated with glycerin, and finally conditioned to a moisture content of 7%.

The membrane thus coated shows 70% less complement activation than an uncoated membrane.

EXAMPLE 6

The same procedure as in Example 5 is used, but the initial membrane is made from a cuprammonium solution with 8.5 wt. % cellulose in the solution. The complement activation is 75% lower than that of the untreated membrane.

EXAMPLE 7

The procedure is like that in Example 5, but the cuprammonium solution, which contains 10 wt. % diethylaminoethylcellulose, is diluted with 5% alkaline ammonia solution. A cellulosic membrane coated with diethylaminoethylcellulose is obtained whose complement activation is reduced by 80% compared to the untreated starting membrane.

While this invention has been described in conjunction with specific embodiments and examples thereof, it is evident that many alternatives, modifications and variations will be apparent to those skilled in the art. Accordingly, the preferred embodiments of the invention and the examples as set forth herein are intended to be illustrative, not limiting. Various changes may be made without departing from the spirit and scope of the invention as defined in the following claims.

What is claimed is:

1. A method for improving the biocompatibility of cellulosic film membranes comprising:
   coating the film membranes after their preparation with a coating consisting essentially of a cellulose derivative selected from the group consisting of a cellulose ether, cellulose ester, cellulose carbamate, and combinations thereof,
   said cellulose ether having a structure conforming to:

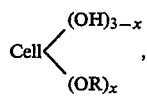

a.

said cellulose ester having a structure conforming to:

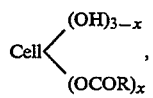

b.

said cellulose carbamate having a structure conforming to:

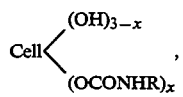

c.

wherein Cell is an unmodified cellulose molecule containing no hydroxyl group; x is degree of modification, said degree of modification being from about 0.002 to about 3; and R is selected from the group consisting of a substituted or unsubstituted alkyl, alkenyl, aryl, arylalkyl group and combinations thereof, said R group having a carbon chain containing 1 to 36 carbon atoms and optionally containing hetero atoms selected from the group consisting of O, S and N, and containing basic, acidic, or both basic and acidic groups.

2. A method according to claim 1, wherein the cellulose ether is basic and selected from the group consisting of dimethylaminoethylcellulose, diethylaminoethylcellulose, dipropylaminoethylcellulose, diisopropylaminoethylcellulose, dibutylaminoethylcellulose, and diisobutylaminoethylcellulose, and x is from about 0.01 to about 0.5.

3. A method according to claim 1, wherein the cellulose ether is selected from the group consisting of benzylcellulose, methylbenzylcellulose and combinations thereof and x is from about 0.005 to about 0.2.

4. A method according to claim 1, wherein the cellulose ester is selected from the group consisting of cellulose dodecenylsuccinate, cellulose hexadecenylsuccinate and combinations thereof and x is from about 0.005 to about 0.5.

5. A method according to claim 1, wherein the cellulose carbamate is selected from the group consisting of cellulose butylcarbamate, cellulose octadecylcarbamate, cellulose hexylcarbamate, cellulose cyclohexylcarbamate, cellulose phenylcarbamate, cellulose tolylcarbamate and combinations thereof, and x is from about 0.05 to about 0.9.

6. A method according to claim 1, wherein the cellulosic film membrane is coated with a cuprammonium solution of the cellulose derivative.

7. A method according to claim 6, further comprising the step of coagulating the cuprammonium solution of the cellulose derivative on the cellulosic film membrane.

8. A method according to claim 7, further comprising the step of washing the coated cellulosic film membrane after coagulating the coated membrane.

9. A method according to claim 8, further comprising the step of drying the coated cellulosic film membrane after washing the coated membrane.

10. A method according to claim 1, wherein the cellulosic film membrane is coated with a solution of the cellulose derivative in dimethylacetamide/lithium chloride or N-methylpyrrolidone/lithium chloride.

11. A method according to claim 10, further comprising the step of coagulating the solution of the cellulose derivative or dimethylacetamide/lithium chloride or N-methylpyrrolidone lithium chloride on the cellulosic film membrane.

12. A method according to claim 11, further comprising the step of washing the coated cellulosic film membrane after coagulating the membrane.

13. A method according to claim 12, further comprising the step of drying the coated cellulosic film membrane after washing the membrane.

14. A method according to claim 1, wherein the cellulose ether, cellulose ester, or cellulose carbamate has a degree of modification greater than about 1.2 and is soluble in an organic solvent.

15. A method according to claim 14, wherein the organic solvent is selected from the group consisting of ketones, ethers, esters, alcohols, glycols, nitriles, amides, or sulfoxides, and mixtures thereof.

16. A method according to claim 14, wherein the cellulosic film membrane is coated with the cellulose derivative dissolved in the organic solvent.

17. A method according to claim 16, further comprising the step of removing the solvent by drying the membrane after the membrane is coated.

18. A method according to claim 1, wherein said basic or acidic groups are selected from the group consisting of $-NR'_2$, $-COOR'$, $-SO_3R'$ and salts thereof, wherein $R'=H$ or $R$.

* * * * *

UNITED STATES PATENT AND TRADEMARK OFFICE
CERTIFICATE OF CORRECTION

PATENT NO. : 5,360,636

DATED : November 1, 1994

INVENTOR(S) : Michael DIAMANTOGLOU et al.

It is certified that error appears in the above-indentified patent and that said Letters Patent is hereby corrected as shown below:

On the cover page, in the ABSTRACT, third line from the bottom, delete "13".

Claim 5, col. 7, line 10, change "0.05" to --0.01--.

Signed and Sealed this

Thirty-first Day of January, 1995

Attest:

BRUCE LEHMAN

*Attesting Officer*     *Commissioner of Patents and Trademarks*